United States Patent [19]

Ohkawa et al.

[11] Patent Number: 5,013,635
[45] Date of Patent: May 7, 1991

[54] INFORMATION STORAGE MEDIUM

[75] Inventors: Hideki Ohkawa, Tokyo; Norio Ozawa, Kawasaki; Hiroyuki Higashino; Motonari Matsubara, both of Yokohama, all of Japan

[73] Assignee: Kabushiki Kaisha Toshiba, Kawasaki, Japan

[21] Appl. No.: 442,713

[22] Filed: Nov. 29, 1989

[30] Foreign Application Priority Data

Nov. 29, 1988 [JP] Japan ................................. 63-299456
Dec. 23, 1988 [JP] Japan ................................. 63-324930
Dec. 27, 1988 [JP] Japan ................................. 63-327568

[51] Int. Cl.$^5$ ................................................ G03C 1/00
[52] U.S. Cl. ...................................... 430/495; 430/346; 430/290; 430/945; 430/270; 346/135.1; 428/64
[58] Field of Search ............... 430/495, 945, 270, 290, 430/346; 346/135.1

[56] References Cited

U.S. PATENT DOCUMENTS

| | | | |
|---|---|---|---|
| 4,373,004 | 2/1983 | Asano et al. | 428/328 |
| 4,433,340 | 2/1984 | Mashita et al. | 346/135.1 |
| 4,478,768 | 10/1984 | Takeoka et al. | 264/1.4 |
| 4,584,258 | 4/1986 | Detty et al. | 430/270 |
| 4,857,373 | 8/1989 | Carcia et al. | 428/64 |

Primary Examiner—Charles L. Bowers, Jr.
Assistant Examiner—Ashley I. Pezzner
Attorney, Agent, or Firm—Foley & Lardner

[57] ABSTRACT

An information storage medium consists of a polycarbonate substrate and a recording layer formed on the substrate and containing an AgTe eutectic alloy, carbon, and hydrogen. Information is recorded on the medium by forming pits in the recording layer upon radiation of a laser beam, and is reproduced by radiating a reproducing laser beam onto the recording layer in which the pits are formed and detecting reflectances.

18 Claims, 13 Drawing Sheets

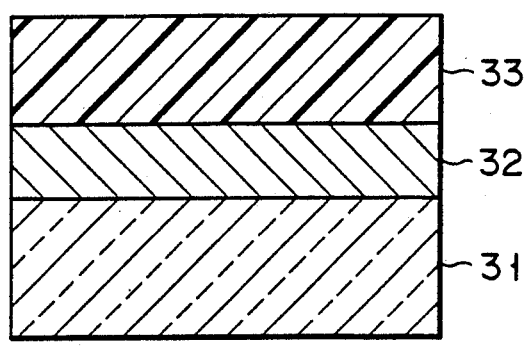
F I G. 4
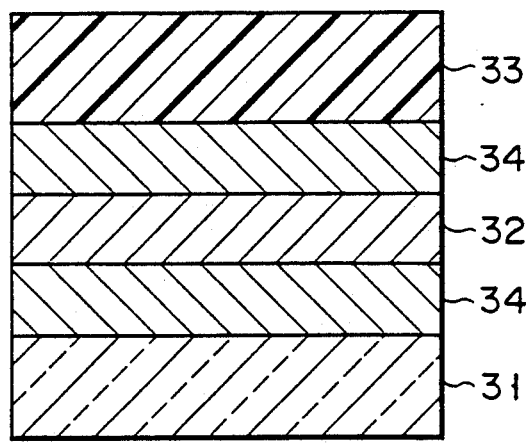
F I G. 5
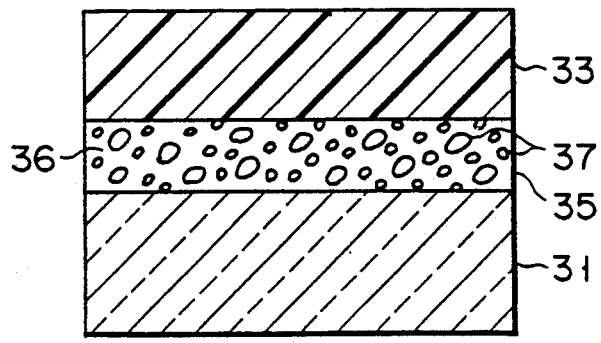
F I G. 6

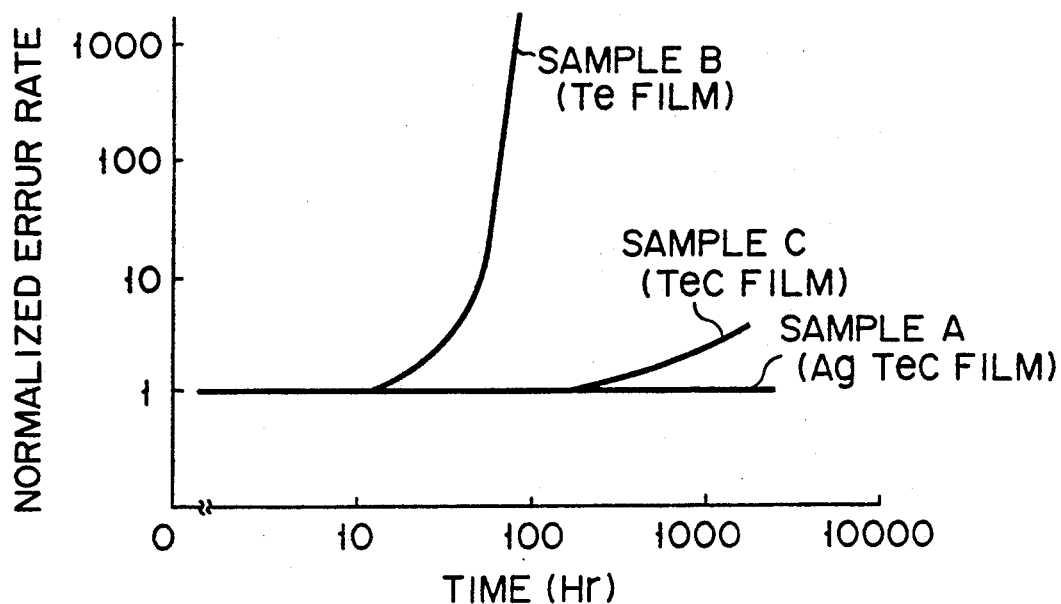
F I G. 11
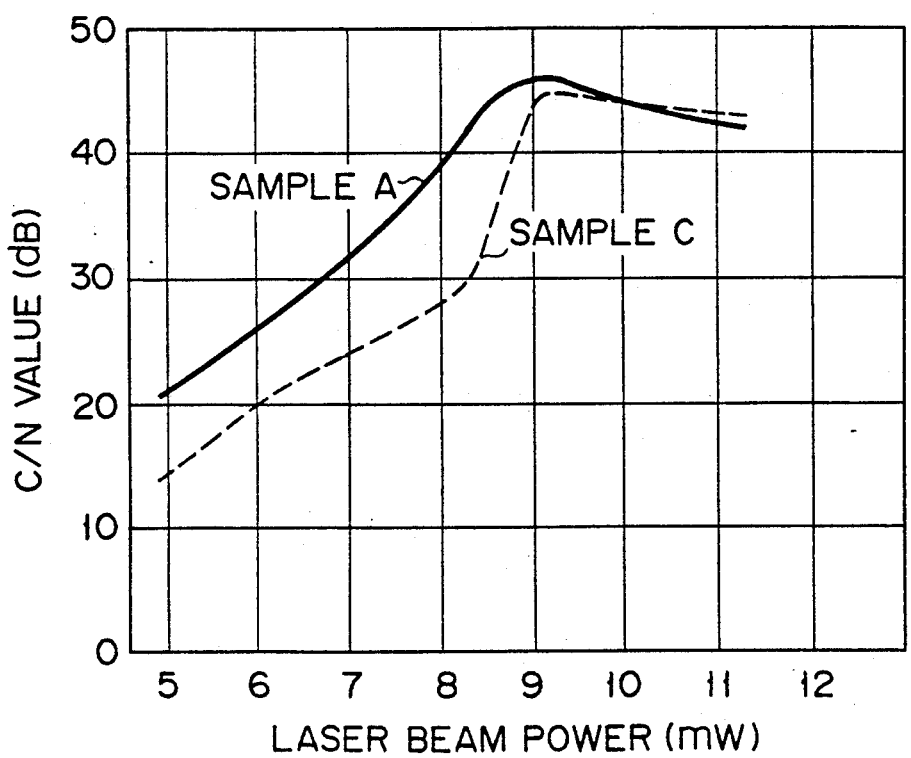
F I G. 12

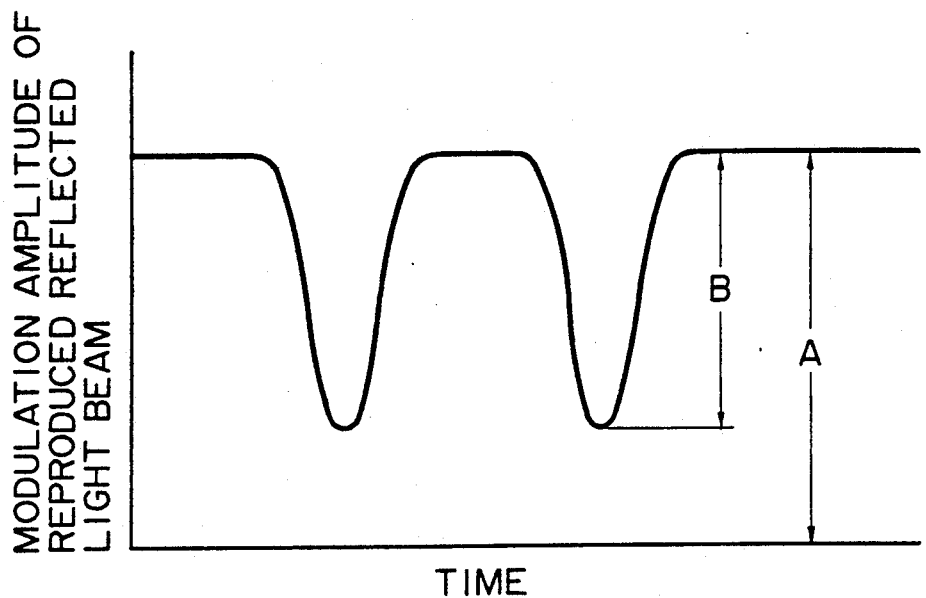
F I G. 17
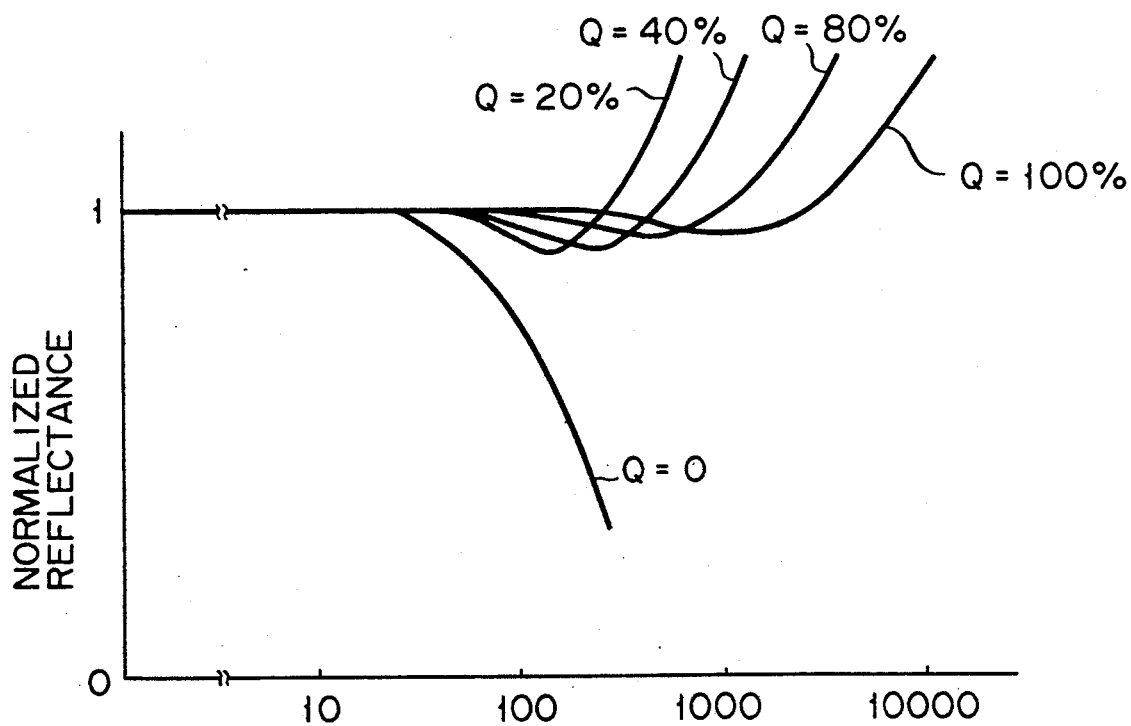
F I G. 18

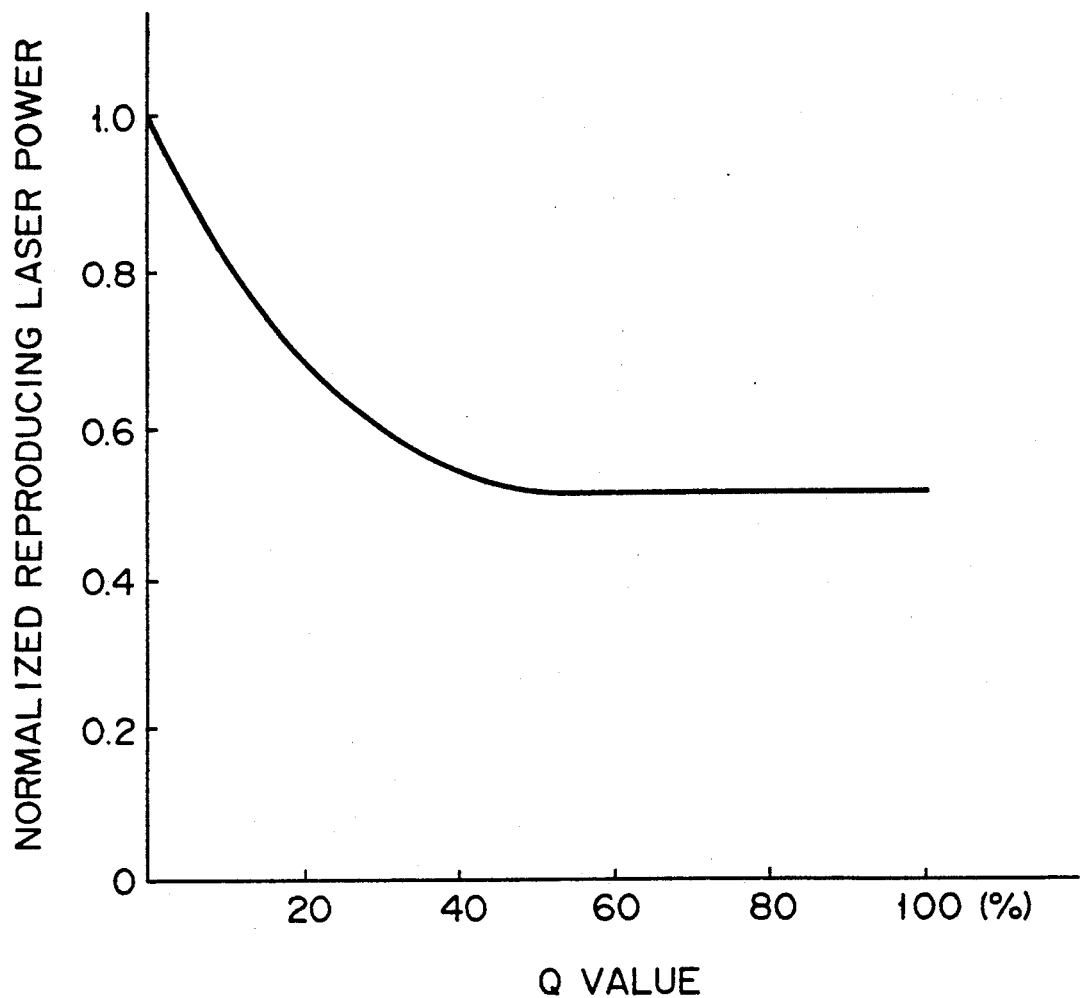
F I G. 19

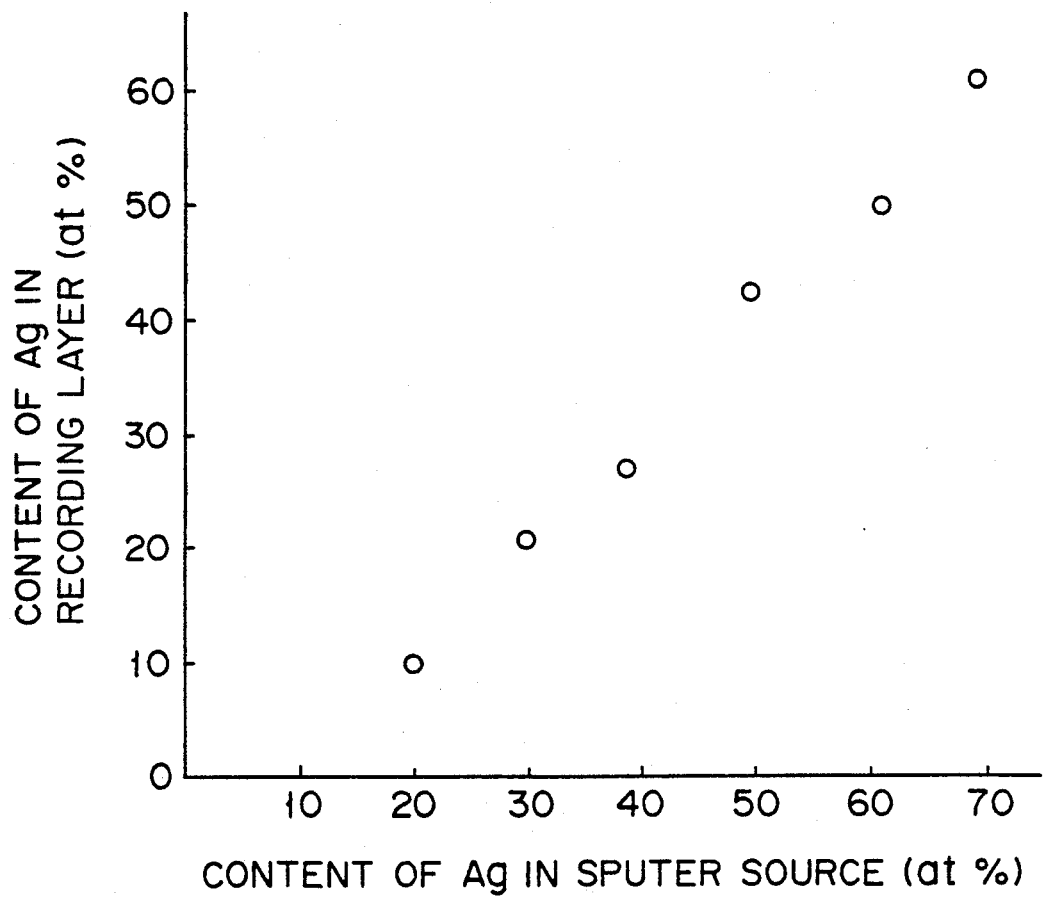
F I G. 21

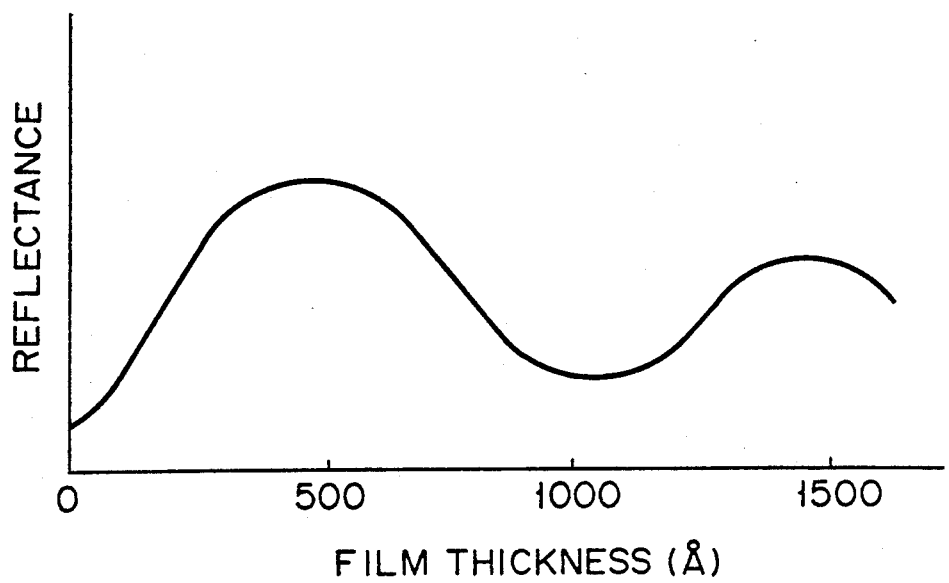
F I G. 22
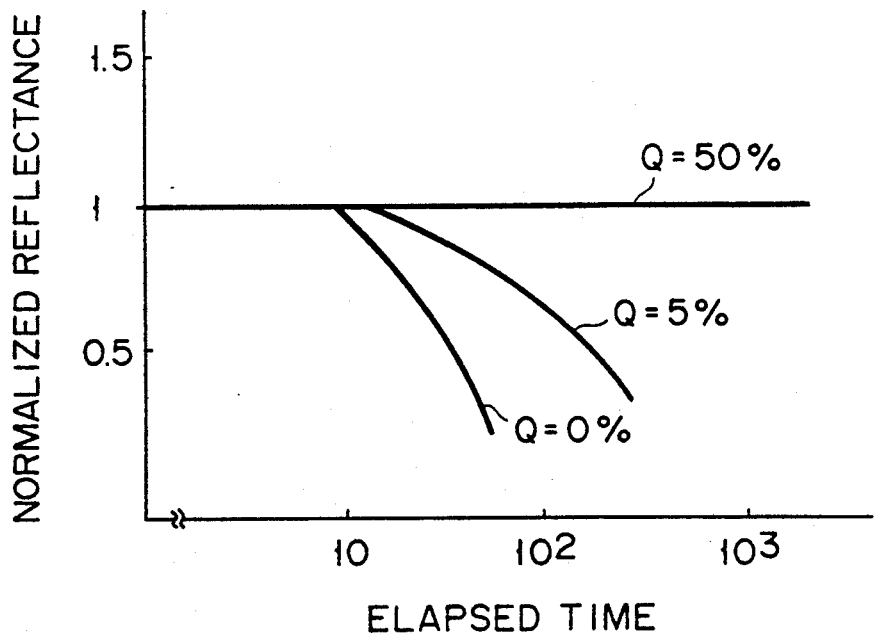
F I G. 23

INFORMATION STORAGE MEDIUM

BACKGROUND OF THE INVENTION

1. Field of the Invention

The present invention relates to an information storage medium on which information is recorded upon radiation of a light beam and, more particularly, to an information storage medium having a recording layer containing Te.

2. Description of the Related Art

An information storage medium having a recording layer consisting of Te is known as a conventional information medium, such as an optical disk, on which information is recorded upon radiation of a laser beam, and from which the recorded information is reproduced.

Te, however, has poor durability in the outer atmosphere, and is susceptible to oxidation especially under conditions of high temperature and humidity.

In order to eliminate such drawbacks, an information storage medium has been proposed (U.S. Pat. No. 4,433,340) having a recording layer consisting of Te as a major element and also containing carbon and hydrogen (to be referred to as a Te-C film hereinafter).

The Te-C film is formed by performing sputtering in an atmosphere containing a hydrocarbon gas such as $CH_4$, using Te as a target, and has an amorphous structure immediately after it is formed (M. Mashita and N. Yasuda, Processing of SPIE, 329, 190 (1982)).

Because the Te-C film is formed such that Te clusters are dispersed throughout the film, it has an oxidation resistance superior to that of a film composed only of Te.

However, in conditions of high temperature in particular, the Te clusters in a Te-C film tend to coagulate, with the result that the Te is crystallized, and a C-H matrix is converted into a gas which is discharged through the surface of the recording layer, coarsening the surface of the layer thereby changing its surface reflectance and increasing the error rate during reproduction of information.

In the meantime, widespread demand for higher data processing speeds has necessitated that information be recorded on optical disks, which are rotated at high speed.

If, however, an optical disk using a conventional Te-C film is rotated at high speed, satisfactory recording may not be performed because a radiation time of a laser beam is too short.

In addition, if the C content of a Te-C film is increased, its record sensitivity is decreased.

SUMMARY OF THE INVENTION

The present invention has been developed for the purpose of eliminating the above-described drawbacks, and has as its object to provide an information storage medium which exhibits excellent durability in the outer atmosphere and has a recording layer of high recording sensitivity.

According to a first aspect of the present invention, there is provided an information storage medium comprising a substrate, and a recording layer provided on the substrate and including an organic discharge polymer film containing a Te eutectic alloy having a crystallization temperature of not less than 50° C., carbon, and hydrogen.

According to a second aspect of the present invention, there is provided an information storage medium comprising a substrate, and a recording layer provided on the substrate and containing an alloy represented by chemical formula $Ag_xTe_{100-x-y-z}C_yH_z$ (wherein x, y, z are represented in at.% and $2 \leq x \leq 45$, $25 \leq y+z \leq 38$).

According to a third aspect of the present invention, there is provided an information storage medium comprising a substrate, and a recording layer provided on the substrate, and containing an alloy of Te and an element belonging to Group IB of the periodic table, carbon, and hydrogen. The recording layer is a sputtering film formed by setting the content of a hydrocarbon gas contained in the sputtering gas to within a range of 5 to 50%.

BRIEF DESCRIPTION OF THE DRAWINGS

FIGS. 4, 5, and 6 are sectional views respectively showing information storage media according to other embodiments of the present invention;

FIG. 11 is a graph showing error rate as a function of time;

FIG. 12 is a graph showing a relationship between the power of a recording laser beam and an obtained C/N value;

FIG. 17 is a graph showing the modulation amplitude of a reproduced reflected light beam;

FIG. 18 is a graph showing changes in the reflectance of recording layers formed with various Q values;

FIG. 19 is a graph showing a relationship between a Q value upon formation of a recording layer and a standardized reproducing laser beam power;

FIG. 21 is a graph showing a relationship between the composition of an Ag-Te alloy sputter source used in the formation of a recording layer and the composition of an Ag-Te alloy contained in the recording layer formed;

FIG. 22 is a graph showing a relationship between the thickness and reflectance of a recording layer; and FIG. 23 is a graph showing the reflectance of a recording layer as a function of time.

DETAILED DESCRIPTION OF THE PREFERRED EMBODIMENTS

Figure 1:
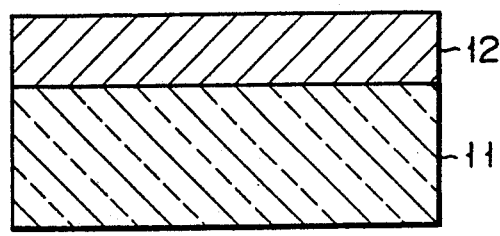
FIG. 1 is a sectional view showing an information storage medium according to an embodiment of the present invention.

The present invention will be described in detail below, beginning with a first embodiment thereof. FIG. 1 is a sectional view showing an information storage medium according to the first embodiment. A substrate 11 is composed of a material of high chemical-stability. When an information reproducing light, e.g., a laser beam, is to be irradiated on the substrate a material transparent to a light beam is used for a substrate. If a laser beam having an oscillation wavelength near the range of near-infrared rays is to be used as an information reproducing light, a resin, e.g., polycarbonate (PC), polymethyl methacrylate (PMMA), polyolefin, or epoxy, or glass is used as a material for the substrate 11. If a light beam is to be irradiated on the recording layer side, an opaque material may be used for the substrate 11.

A recording layer 12 is of a heat mode type in which information is recorded by forming pits upon radiation of a light beam. The layer 12 is formed of an organic polymer film containing a Te eutectic alloy having a crystallization temperature of 50° C. or more, carbon (C), and hydrogen (H). The layer 12 has a structure in which Te eutectic alloy clusters are dispersed in a C-H matrix having a chemical bond of C and H.

In this case, as elements constituting the Te eutectic alloy, elements belonging to Group IB of the periodic table, such as Ag, Cu, and Au, and low-melting metals such as Ge, Sb, and Bi are available. Among these elements, Ag is especially preferable.

When Ag is used as an element constituting the Te eutectic alloy, the melting point of the alloy rises with an increase in content of Ag. As the result, the energy of the light beam required for recording information is also increased. Therefore, the content of Ag is preferably set within the range such that above-mentioned inconvenience does not occur, i.e., $2 \leq Ag \leq 34$ at.% is preferable.

The thickness of the recording layer 12 is preferably set to be 50 to 1,000 Å. If it exceeds 1,000 Å, the heat capacity is increased, resulting in degradation in sensitivity. When it is below 50 Å, film formation becomes difficult. In this case, even if a film is formed, the film becomes discontinuous, and pin holes may be formed upon radiation of a light beam. Such pin holes may be erroneously detected as pits during an information reproducing (read) operation, and are not desirable for recording layer 12. The thickness of the recording layer is more preferably set to be 100 to 300 Å.

Figure 2:
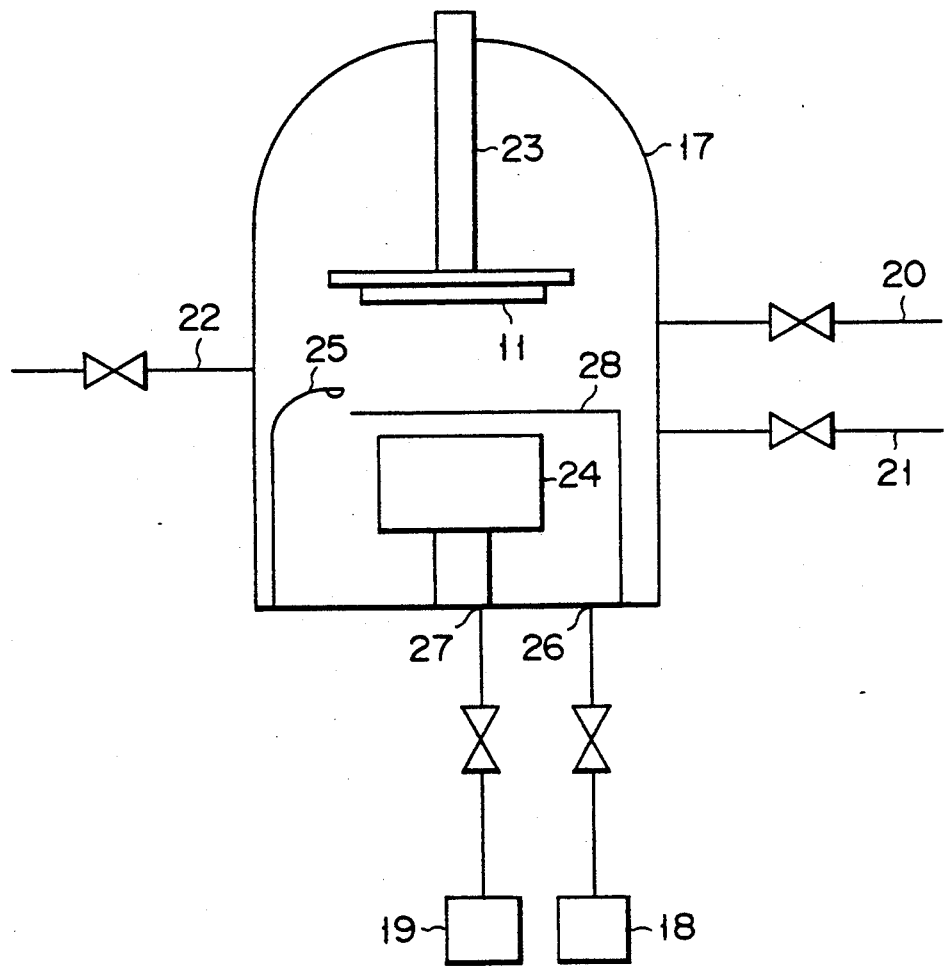
FIG. 2 is a view showing a schematic arrangement of an apparatus for forming a recording layer of an information storage medium according to the present invention.

When the recording layer 12 described above is to be formed, a sputtering apparatus such as that shown in FIG. 2 may be used. This apparatus performs film formation by sputtering, using a Te eutectic alloy as a sputtering source (target) in an atmosphere containing hydrocarbon, and comprises a vacuum vessel 17 having exhaust ports 26 and 27 formed in the bottom thereof. Rotary pump 18 and a cryopump 19 are respectively connected to the ports 26 and 27, and are used to evacuate the vacuum vessel 17. An Ar gas line 20, a CH4 gas line 21, and an N2 gas line 22 serving as gas feed ports are connected to the side wall of the vessel 17, and are respectively connected to Ar, CH4, and N2 gas sources (not shown).

A support member 23 is arranged at an upper portion in the vacuum vessel 17. The substrate 11 is supported by the support member 23 so as to be substantially horizontal. The substrate 11 is rotated by a rotating unit (not shown) while the substrate 11 is attached to the support member 23.

A sputtering source 24 consisting of the above-described Te eutectic alloy is arranged on the bottom in the vacuum vessel 17 so as to oppose the support member 23. A power source (not shown) is connected to the sputtering target 24. A monitor unit 25 is arranged above the target 24. In addition, a shutter 28 is arranged immediately above the target 24 so as to be freely opened or closed.

When a recording layer is to be formed by using the apparatus having the above arrangement, the vacuum vessel 17 is evacuated to 0.2 Torr by the rotary pump 18, and is evacuated to $1 \times 10^{-5}$ Torr by the cryopump 19.

Ar and CH4 gases are respectively fed from the Ar and CH4 gas sources into the vacuum vessel 17 through the Ar and CH4 gas lines 20 and 21 at predetermined flow rates. The pressure in vessel 17 is kept at a predetermined value, e.g., $5 \times 10^{-3}$ Torr.

While the substrate 11 arranged on the support member 23 is rotated at a predetermined speed, e.g., 60 rpm, a predetermined voltage is applied to the target 24 with the shutter 28 being closed, thereby performing preliminary sputtering. Upon confirmation of stable sputtering discharge, the shutter 28 is opened. With this operation, a plasma is generated between the target 24 and the substrate 11, and sputtering is performed for a predetermined period of time, thus forming a recording layer consisting of a Te eutectic alloy having a predetermined thickness on the substrate. In this case, a sputter amount from the target 24 is monitored by the monitor unit 25, and a voltage to be applied to the target 24 is adjusted so as to set a predetermined value.

As a result, an information storage medium comprising the recording layer 12 formed on the substrate 11 is obtained. The recording layer 12 is formed of an organic polymer film containing a Te eutectic alloy having a crystallization temperature of 50° C., C, and H.

Upon completion of sputtering, the vacuum vessel 17 is evacuated to, e.g., $1 \times 10^{-5}$ Torr or less by the cryopump 19. N2 gas is then fed into the vessel 17 through the N2 gas line 22 so as to restore the pressure in the vessel 17 to the atmospheric pressure, and the medium is taken out from the vessel 17.

The sputtering apparatus briefly described above preferably employs a magnetron sputtering system in which a magnet is arranged below the target 24. In this system, a magnetic field is formed in the vacuum vessel, and electrons in a plasma can be trapped within an area near the sputter source, thereby preventing a rise in substrate temperature upon incidence of the electrons in the plasma on the substrate. This system is effective especially when a material having low heat resistance, such as PC or PMM is used for a substrate. In addition, when a plasma formed on the sputtering source is trapped within a magnetic field, since a plasma polymer is not decomposed to be deposited on the sputtering source, the sputtering source can be easily sputtered to increase a film formation rate. Other rare gases may be used in place of Ar gas. In addition, the hydrocarbon gas introduced used when the recording layer is formed is not limited to methane. Other hydrocarbon, such as ethylene, acetylene, ethane, propane, or styrene, may be used. Moreover, sputtering may be performed by only feeding a hydrocarbon gas such as $CH_4$ into the vacuum vessel.

When information is to be recorded on the information storage medium having the above-described arrangement, a recording light beam is radiated onto the recording layer to form pits.

When recorded information is to be reproduced, a laser beam having small power is radiated on the recording layer, and a difference in reflectance between a pit portion and a non-pit portion is detected.

Since such an information storage medium comprises a recording layer having a crystallization temperature of 50° C. or more which is higher than room temperature, Te eutectic alloy clusters are stable in an amorphous state, and the medium has high environmental resistance. In addition, since the medium contains a low-melting Te eutectic alloy, its recording sensitivity is high.

A second embodiment of the present invention will be described below. Similar to the first embodiment, an information storage medium according to this embodiment is of the type which information is recorded on the medium by forming pits. The medium of the second embodiment has substantially the same arrangement as that of medium of the first embodiment except for the composition of a recording layer 12. The recording layer 12 contains an alloy represented by chemical formula $Ag_xTe_{100-x-y-z}C_yH_z$ (wherein x, y, z are at.% and $2 \leq x \leq 45$, $25 \leq y+z \leq 38$). Note that when the recording layer 12 consists of only these elements, the content of Ag+Te falls in the range of $62 \leq Ag+Te \leq 75$. Similar to the first embodiment, the recording layer 12 has a structure in which Te eutectic alloy clusters are dispersed in a C-H matrix.

Figure 3:
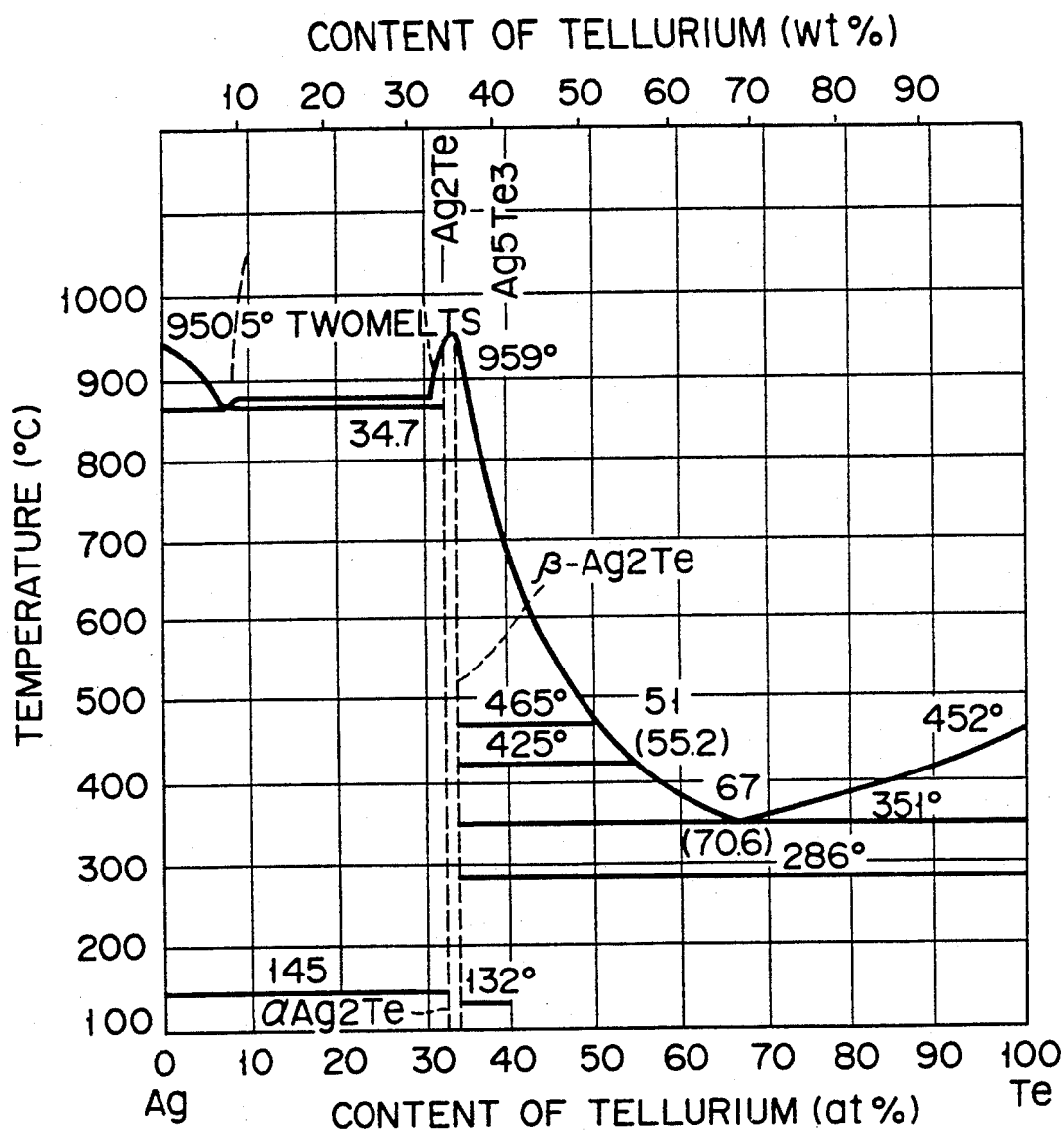
FIG. 3 is a graph showing a state of an Ag-Te two-element alloy.

It is already known that an Ag-Te two-component alloy has a state shown in FIG. 3. It is confirmed from FIG. 3 that $Ag_2Te$ and $Ag_5Te_3$ are present as intermetallic compounds. Since these intermetallic compounds respectively have melting points of 959° C. and 700° C. which are much higher than a melting point of 450° C. of Te, they are inferior in practicability to Te in the heat mode recording scheme for forming pits by melting a recording layer. However, $Ag_{33}Te_{67}$ of an eutectic composition has a very low melting point of 351° C., and in such compositions that the eutectic alloy is precipitated or near its range of 2 to 45 at.% of Ag, have a melting point (351° to 425° C.) which is lower than that of Te in the range. Therefore, the AgTe eutectic alloy film has a higher record sensitivity than the Te film.

Furthermore, since Ag is added, additional effects can be expected. For example, pits have uniform sizes, and the shapes of rims of pits are uniform, thus decreasing a recording noise.

Such a recording layer can be formed by an apparatus similar to that of the first embodiment. However, adjustment of the flow rates of gases is required to cause the content of C+H to fall in the range defined above.

A third embodiment will be described below. Similar to the first and second embodiments, in this embodiment, an alloy containing Te as a major element is used as an alloy to be contained in a recording layer, and the recording layer also contains C and H. However, the third embodiment employs a different recording scheme. More specifically, in this embodiment, a recording scheme using a phase change type recording layer will be exemplified. In this recording scheme, information is recorded by radiating a light beam onto a recording layer to change an atomic configuration at the beam-irradiated portion, and the recorded information is erased by changing the atomic configuration again.

An information storage medium according to this embodiment has a structure shown in, e.g., FIG. 4. Referring to FIG. 4, a substrate 31 is substantially identical to the substrate 11.

A recording layer 32 of a phase change type described above is formed on the substrate 31. The recording layer 32 is a sputtering film containing an alloy formed of Te and an element of Group IB of the periodic table, C, and H. When a ratio of the flow rate of hydrocarbon gas to that of a rare gas to be fed in film formation is represented by Q (%), the ratio Q falls in the range of $5 \leq Q \leq 50$.

An organic protective layer 33 for preventing flaws is formed on the recording layer 32. The layer 33 is composed of a resin, e.g., an ultraviolet-curing resin. Note that this protective layer 33 is preferably formed, but need not necessarily be formed.

In addition, the information storage medium according to this embodiment may have a structure shown in FIG. 5 or 6.

FIG. 5 shows a structure in which inorganic protective layers 34 for preventing changes in a recording layer 32 over time are formed to sandwich the recording layer 32. This protective layer 34 is composed of, e.g., an oxide, fluoride, sulfide, or nitride of metal or a submetal.

In FIG. 6, a recording layer having a structure in which a constituent material 37 of a recording layer 32 is dispersed in a material 36 constituting an inorganic protective layer 34 is formed on a substrate 31.

Similar to the first and second embodiments, the recording layer 32 can be formed by the apparatus shown in FIG. 2 using a sputtering target composed of an alloy of Te and an element belonging to Group IB of the periodic table. In this case, as described above, a flow rate ratio Q of a hydrocarbon gas such as $CH_4$ is defined within the above-described range.

A recording layer which is obtained by feeding a hydrocarbon gas and a rare gas and using a sputtering target composed of an alloy of Te and an element belonging to Group IB of the periodic table is a film having excellent environmental resistance, i.e., having a long service life even under the conditions of high temperatures and humidities. In this case, if the flow rate ratio Q of a hydrocarbon gas is 5% or less, it is not sufficient for an improvement in environmeatal resistance. If the Q value exceeds 50%, the content of carbon in the recording layer is excessively increased, and the optical absorbance is decreased. As a result, the power of a light beam required for recording and erasing of information as a phase change type recording layer is increased, and hence the resultant layer cannot be used in practice. That is, the layer has a low recording/erasing sensitivity.

In contrast to this, if film formation is performed in the range of $5 \leq Q \leq 50$, a phase change type information storage medium comprising a recording layer having excellent environmental resistance and a high recording/erasing sensitivity can be obtained.

Note that the protective layers 33 and 34 can be basically formed by a sputtering technique using the apparatus shown in FIG. 2. In addition, the organic protective layer can also be formed by a spin coat method.

EXAMPLES

Examples of the present invention will be described below.

EXAMPLE 1

This Example corresponds to the first embodiment of the present invention.

A PC substrate and $Ag_{33}Te_{67}$ as a sputtering source were set in the vacuum vessel shown in FIG. 2. The vessel was then evacuated to $1 \times 10^5$ Torr by the rotary pump and the cryopump. While argon gas and $CH_4$ gas were respectively fed at 10 SCCM, the pressure in the vessel was kept at $5 \times 10^{-3}$ Torr by adjusting an exhaust amount. Upon confirmation of no variation in pressure in the vacuum chamber, preliminary sputtering was performed. Thereafter, while the substrate was rotated at 60 rpm, an electric power of 100 W was supplied to the sputtering source for 5 minutes to form a recording layer containing a AgTe alloy, C, and H (to be referred to as an AgTeC film hereinafter) having 250 Å thick on the substrate. With this process, an optical disk sample was prepared (to be referred to as a sample A hereinafter).

For comparison, a Te recording layer, a recording layer containing Te, C, and H (to be referred to as a TeC film hereinafter), and a recording layer containing Ag and Te (to be referred to as an AgTe film hereinafter) were formed, thus preparing optical disk samples (to be referred to as samples B, C, and D hereinafter).

Figure 7:
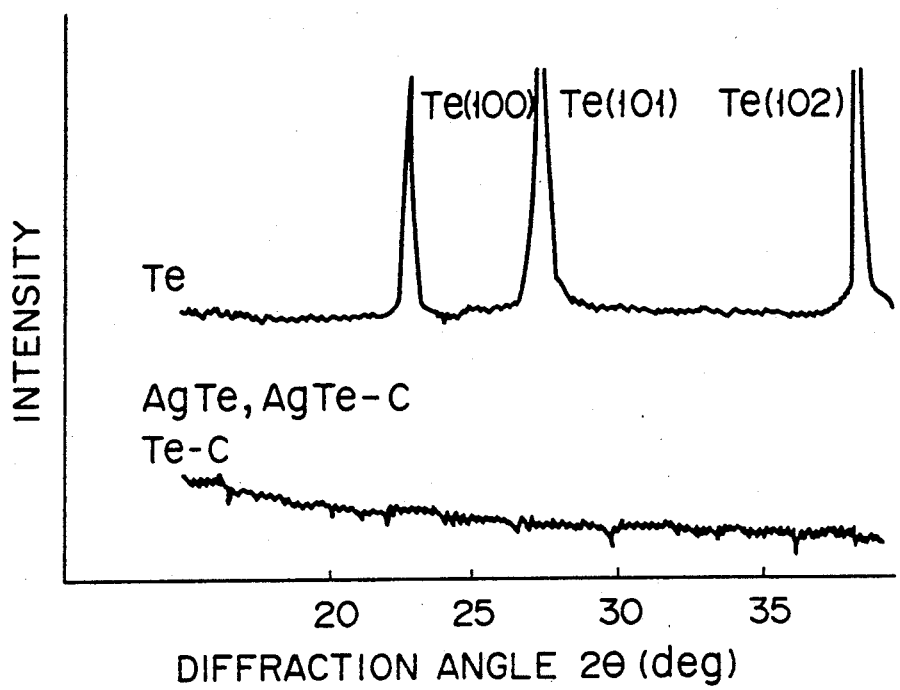
FIG. 7 is a graph showing an X-ray diffraction profile of a recording layer which is formed in accordance with the present invention.

X-ray diffraction analysis of these samples were performed to confirm their crystal states. FIG. 7 shows the results. With regard to the sample B having the Te film as a recording layer, X-ray diffraction peaks representing crystal faces of Te were recognized, and hence the Te film was confirmed to be crystalline. In contrast to this, with regard to the samples A, C, and D respectively having the AgTeC, TeC, and AgTe films, no diffraction peak was recognized, and hence these films were confirmed to be amorphous. Since the recording layer of the sample B had a crystal state, a laser beam was modulated at a grain boundary to generate grain boundary noise. In contrast to this, since the samples A, C, and D respectively had amorphous recording layers and no grain boundary, such grain boundary noise was not generated.

Figure 8:
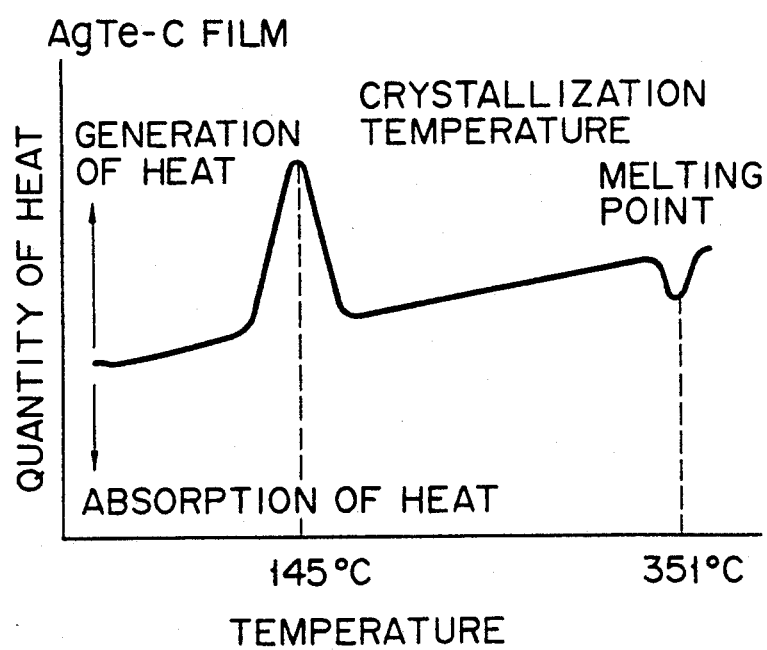
FIGS. 8, 9, and 10 are graphs respectively showing DSC analysis results in respect of AgTeC, Te, and AgTe films.
Figure 9:
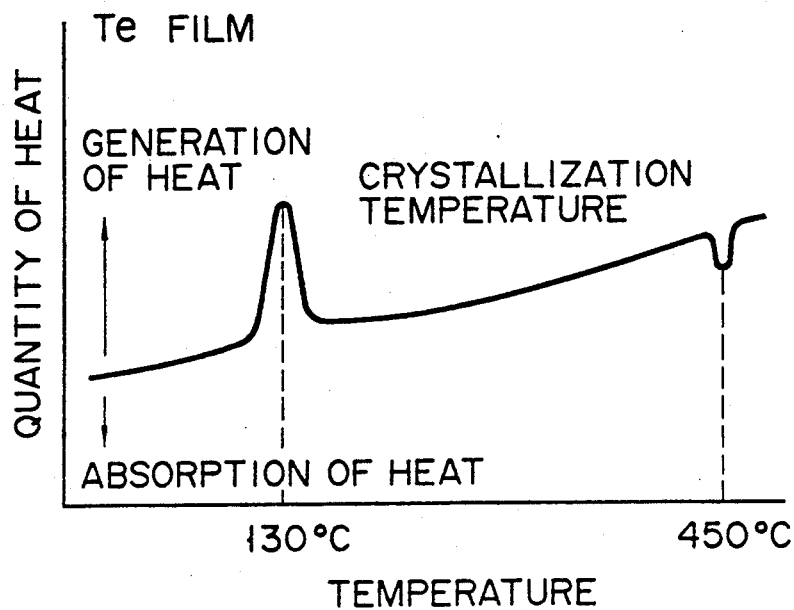
Figure 10:
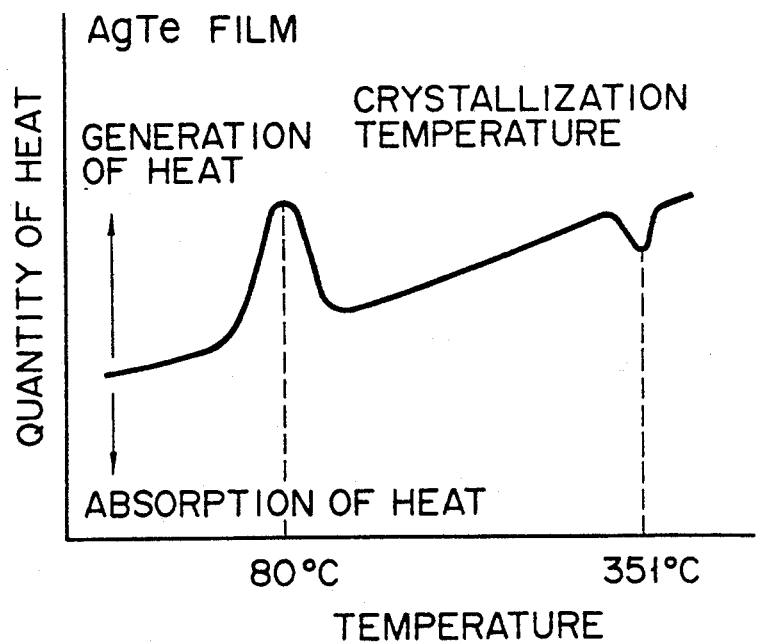

The crystallization temperatures of the AgTeC, TeC and AgTe films of the samples A, C, and D were measured by differential scanning calorimetry (DSC). FIGS. 8 to 10 are graphs respectively showing the results of DSC which was performed by heating the AgTeC, TeC, and AgTe films at a temperature rise rate of 20° C./min in a flow of $N_2$ gas.

It was confirmed from these graphs that the crystallization temperatures of the TeC, AgTe, and AgTeC films were 130° C., 80° C., and 145° C., respectively. Therefore, it was confirmed that the AgTeC film had a higher crystallization temperature than the AgTe film, and was more chemically stable.

The error rates of the respective recording layers were measured. The samples A, B, and C were left under a condition of a relative humidity of 90%, and information was recorded in each sample after a predetermined period of time elapsed, thereby measuring the error rates of the recording layers. FIG. 11 shows the results. FIG. 11 shows a relationship between an elapsed time and an error rate, in which the abscissa axis represents an elapsed time, and the ordinate axis represents an error rate which is normalized assuming that an error rate in the initial period is 1. It was found from FIG. 11 that the error rate of the sample B comprising the Te film was increased after only a few days. Similarly, the error rate of the sample C comprising the TeC film was gradually increased after 200 hours elapsed. In contrast to this, with regard to the sample A comprising the AgTeC film according to the present invention, the error rate was scarcely increased during measurement. In addition, upon X-ray diffraction analysis, the AgTeC film of the sample A was confirmed to be kept in an amorphous state after 2,000 hours elapsed. That is, it was confirmed that the AgTeC film of the sample A was chemically stable under conditions of high temperatures and humidities.

Relationships between the magnitudes of laser powers required for recording and the C/N (carrier/noise) values of reproducing signals of recorded information were checked with respect to the samples A and C. In this case, a semiconductor (GaAs) laser was used as a laser source. This laser source emitted a laser beam having a wavelength of 830 nm and included an objective lens having a numerical aperture of 0.52. Information was recorded by setting the pulse width of a laser beam to be radiated to be 50 nsec; the linear velocity of an optical disk, 5.5 m/sec; and a write frequency, 3.7 MHz. Thereafter, the C/N values of reproducing signals were measured. FIG. 12 shows a relationship between the power of a laser beam and a C/N value, in which the abscissa axis represents the power of a laser beam used in a recording operation, and the ordinate axis represents a C/N value. As shown in FIG. 12, the sample A exhibited a higher C/N value than the sample C. It was confirmed, therefore, that the AgTeC film had a higher recording sensitivity than the TeC film.

Figure 13:
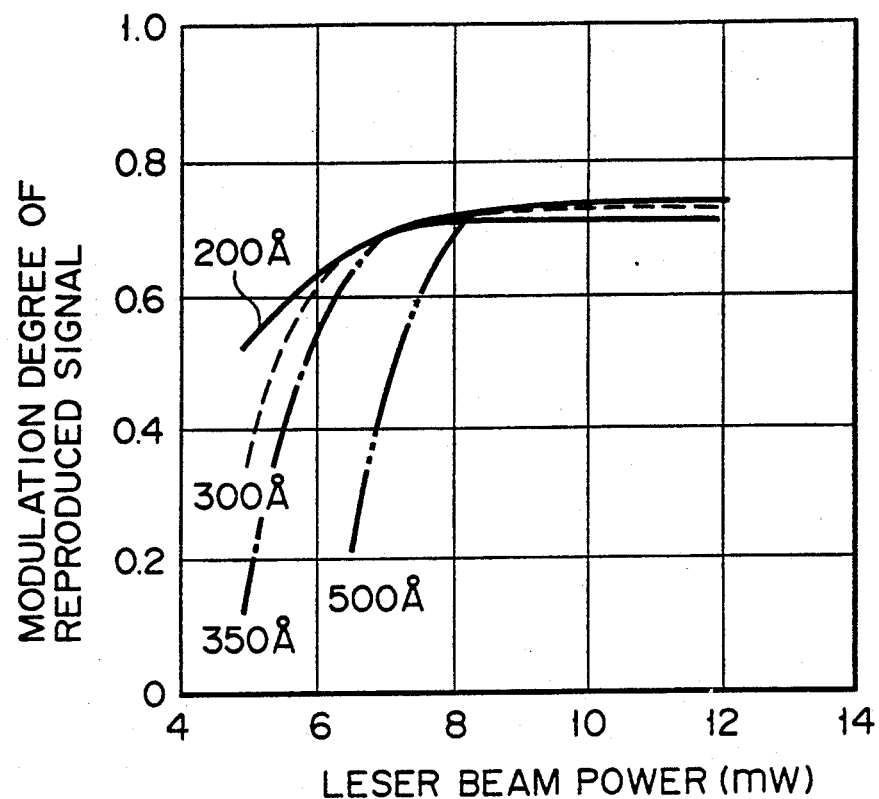
FIG. 13 is a graph showing a relationship between the thickness of a recording film and the modulation degree of a reproducing signal.

An experiment was performed with respect to a relationship between a recording laser beam power and the modulation degree of a reproduced signal. In this experiment, samples E, F, G, and H were prepared by setting the thickness of the AgTeC film of the sample A to be 200 Å, 300 Å, 350 Å, and 500 Å. FIG. 13 shows relationships between recording laser beam powers and the modulation degrees of reproduced signals with respect to the samples having the respective AgTeC films. In this case, a recording laser beam was caused to be irradiated on the substrate of each sample at a pulse width of 60 nsec and a linear velocity of 5.5 m/sec. It was confirmed from FIG. 13 that a reproduced signal having a sufficient modulation degree was obtained by using a practical laser beam having a power of 8 mW as long as the thickness of a recording layer fell in the range of 200 to 500 Å. It was also found that if the thickness of a recording layer was 300 Å or less, a reproduced signal having a sufficient modulation degree was obtained even by a laser beam having a power of 6 mW.

Figure 14:
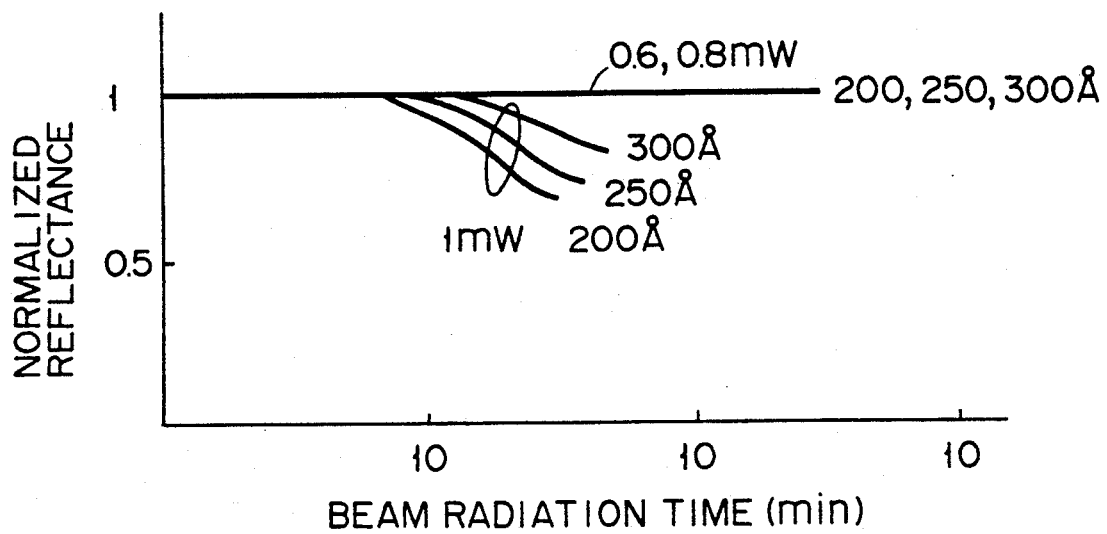
FIG. 14 is a graph showing the reflectance of a recording layer as a function of time.

An experiment for confirming the allowable powers of reproducing laser beams were performed. A reproducing laser beam was continuously held at a track corresponding to the position having a linear velocity of 5.5 m/sec with respect to the samples E, A, and F respectively having the 200-Å, 250-Å, and 300-Å thick recording layers, and changes in reproducing laser beam power over time of each sample were measured. FIG. 14 shows a relationship between a radiation time of a reproducing laser beam plotted along the abscissa axis and a reflectance which is normalized assuming that an initial reflectance is 1 and is plotted along the ordinate axis. The power of a reproducing laser beam was set to 0.6 mW, 0.8 mW, and 1.0 mW. It was found from FIG. 14 that the reflectance in the range of 200 to 300 Å (thickness of recording layers) was not changed up to a reproduced signal of a laser power of 0.8 mW after about three hours. However, when a laser beam having a power of 1.0 mW was used, the reflectance was decreased after 10 minutes, resulting in degradation in the recording layer.

The maximum allowable reproducing laser beam power of an additional recording type optical disk, standardization of which has recently been promoted, is set to 0.5 mW at a rotational speed of 1,800 rpm of the disk and a linear velocity of 5.5 m/sec. It was confirmed, therefore, that these samples exhibiting no change in reflectance of their recording layers at a power of 0.8 mW of a reproducing laser beam after three hours sufficiently satisfied this standard.

EXAMPLE 2

This Example corresponds to the second embodiment of the present invention.

A PC substrate and $Ag_{33}Te_{67}$ as a sputtering source were set in the vacuum vessel of the apparatus shown in FIG. 2. The vessel was then evacuated to $1 \times 10^{-5}$ Torr by the rotary pump and the cryopump. While argon gas and $CH_4$ gas were respectively fed in the vessel at 5 SCCM, the exhaust amount was adjusted by using the valve to keep the pressure in the vessel at $5 \times 10^{-5}$ Torr. In this case, if the ratio of the flow rate of $CH_4$ gas to that of Ar gas is represented by Q, Q=50% was set.

While the substrate was rotated at 60 rpm in this state, an electric power of 100 W was supplied from a DC power source to the sputter source for 5.2 minutes to form a recording layer containing AgTe alloy, C, and H having 300 Å-thick on the substrate, thus preparing an optical disk sample (sample I).

Figure 15:
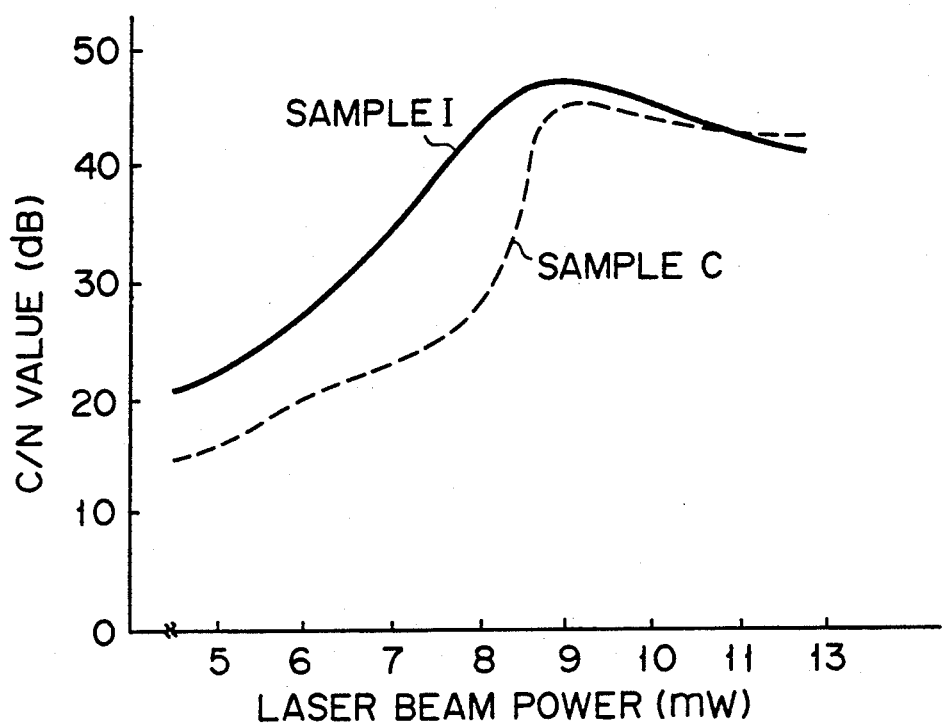
FIG. 15 is a graph showing a relationship between the power of a recording laser beam and an obtained C/N value.

Similar to the sample A in EXAMPLE 1, the sample I exhibited a higher C/N value than the sample C comprising the TeC film, as shown in FIG. 15.

The flow rates of $CH_4$ gas and Ar gas were variously changed following the same procedures as those of the sample I to change the above g value to 0%, 20%, 40%, 60%, 80%, and 100%, and recording layers were formed with these Q values, thus preparing samples J, K, L, M, N, and O).

Figure 16:
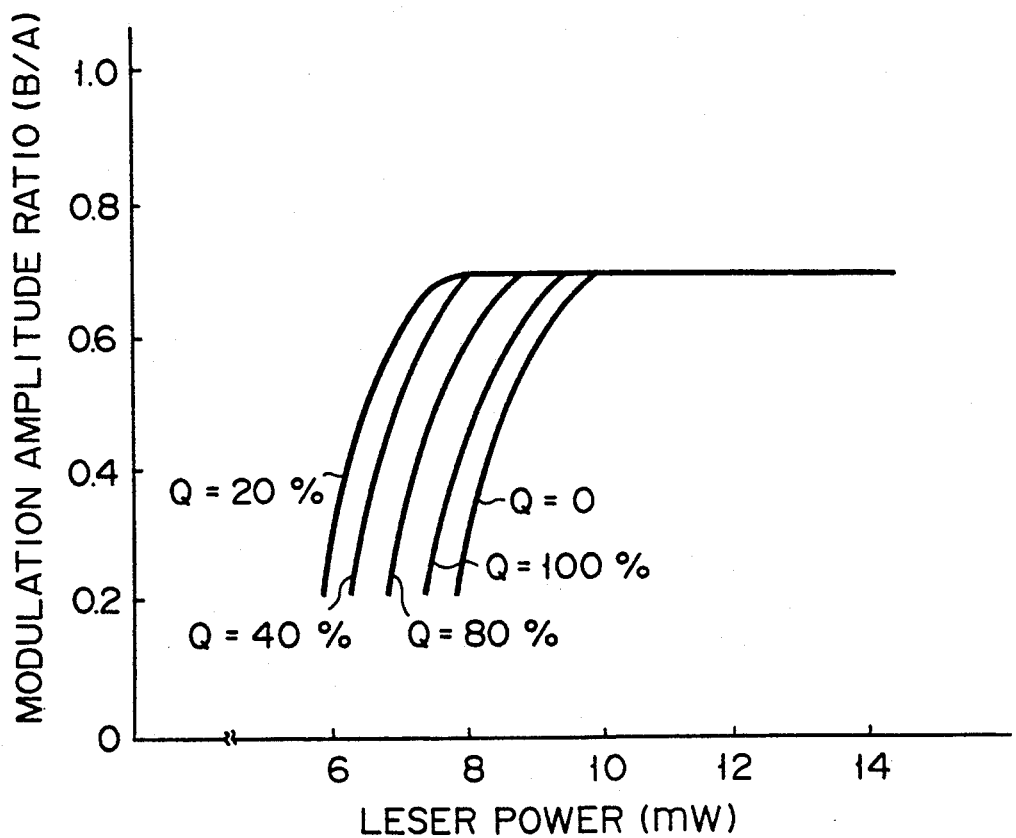
FIG. 16 is a graph showing the recording sensitivities of recording layers formed with various Q values.

An experiment on the recording sensitivity characteristics of these samples was performed. FIG. 16 shows the recording sensitivity characteristics of the respective samples, in which a recording laser power is plotted along the abscissa axis and the modulation amplitude ratio of a reproducing reflected light beam is plotted along the ordinate axis. The modulation amplitude ratio shown in FIG. 16 corresponds to the ratio of a modulation amplitude B of a reproduced reflected light beam at a pit portion to a modulation amplitude A at a non-pit portion shown in FIG. 17. The pulse width of a recording laser beam was set to be 80 nsec.

As shown in FIG. 16, the sample K having the recording layer which was formed with Q=20% exhibited the highest recording sensitivity. The recording sensitivity was lowered in the order of the samples L and N with Q=40% and 80%. The sample O having the recording layer which was formed with Q=100%, i.e., by sputtering with only $CH_4$ gas exhibited a lower sensitivity. The sample J having the recording layer which was formed with Q=0%, i.e., made of only AgTe exhibited the lowest record sensitivity.

An experiment on durability was performed. FIG. 18 shows changes in reflectance of recording layers under the conditions of high temperature and humidity, i.e., at a temperature 60° C. and a relative humidity of 90%, in which the abscissa axis represents an experiment time and the ordinate axis represents a reflectance which is normalized assuming that a reflectance immediately after formation of a recording layer is 1. In this case, a decrease in reflectance is used as a parameter of oxidation resistance. It is apparent from FIG. 18 that the reflectance of the sample J with Q=0% is decreased at the highest rate, and hence exhibits the worst oxidation resistance. In addition, it was confirmed that as the Q value was increased, a longer time was taken for a reflectance to start decreasing, i.e., oxidation resistance was improved. The reflectance of the sample Q with Q=100% underwent almost no decrease even after 10,000 hours.

An experiment on reproducing laser beam power was performed. FIG. 19 shows a relationship between the Q value plotted along the abscissa axis and a maximum allowable reproducing laser beam power plotted along the ordinate axis, which is normalized assuming that a reproducing laser beam power at Q=0% is 1. It is apparent from FIG. 19 that the maximum allowable reproducing laser beam power becomes substantially constant when the Q value exceeds 50%, and that information can be reproduced with a high reproducing laser beam power within the range of 0 to 50%. That is, the power margin of a reproducing laser beam can be broadened, and power adjustment of a reproducing laser beam is facilitated within the range of 0 to 50%.

In a summary of the results shown in FIGS. 16, 18, and 19, recording layers formed with Q=40 to 80% are superior to other recording layers in record sensitivity, oxidation resistance, power margin of a reproducing laser beam.

Figure 20:
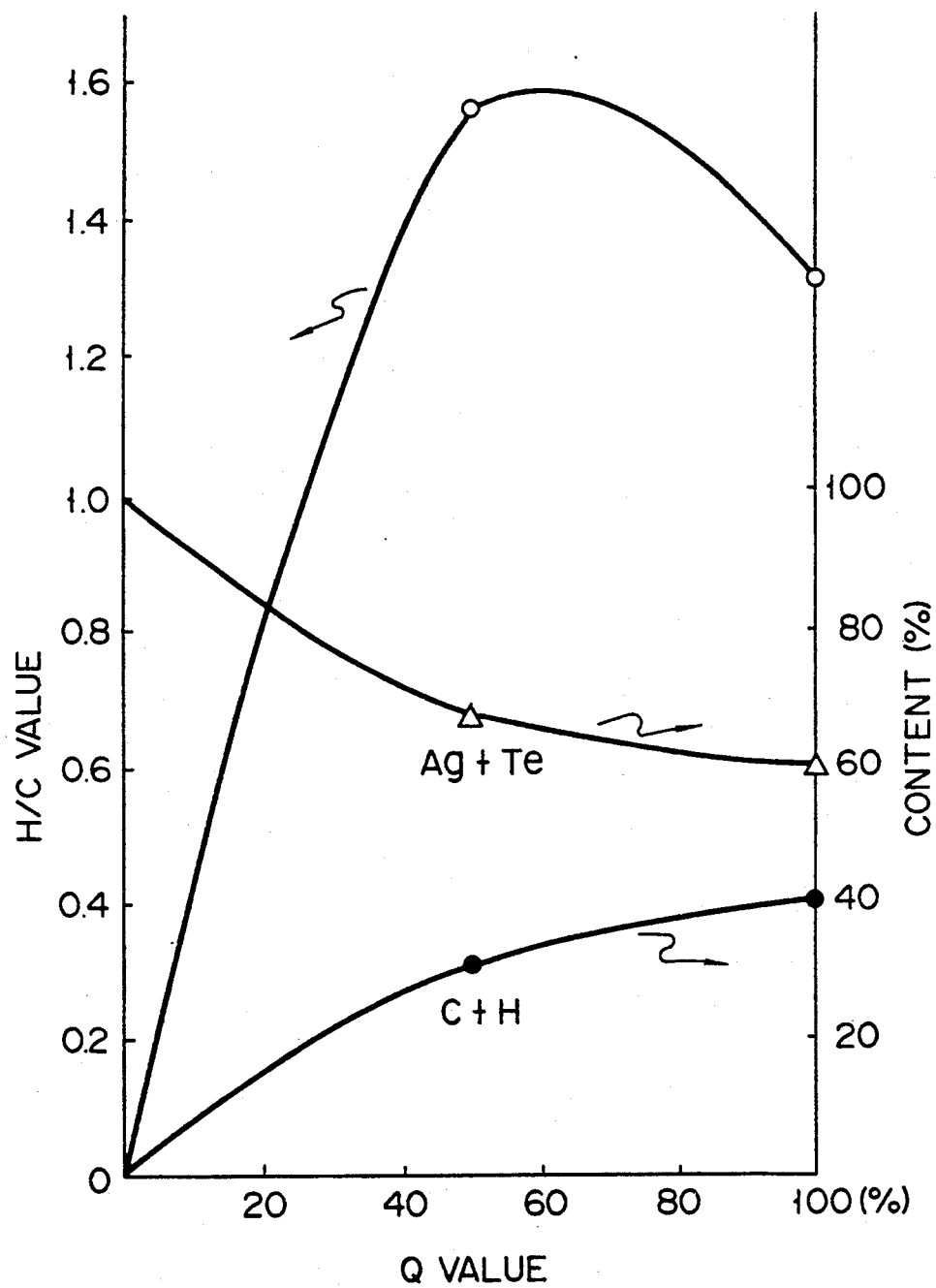
FIG. 20 is a graph showing a relationship between a Q value upon formation of a recording layer and the composition of the recording layer.

FIG. 20 shows composition analysis values of the recording layers with the respective Q values. It was confirmed from FIG. 20 that a composition corresponding to Q=40 to 80% had 25 to 38 at.% of C+H, and that the content of Ag+Te corresponded to a value obtained by subtracting the content of C+H from 100 at.%, i.e., 62 to 75 at.%. In this case, the total content of C and H was obtained by elemental analysis, and that of Ag and Te was obtained by atomic absorption spectrochemical analysis.

In addition, it was found that an H/C value corresponding to Q=40 to 80% was 1.30 to 1.50.

If the composition falling in the above-described range can be obtained by elemental analysis, it can be determined without an acceleration test requiring 1,000 hours or more as described above that the corresponding recording layer is excellent in oxidation resistance or durability. In addition, it takes only a short time, e.g., about half a day to determine that the layer has an high recording sensitivity and a wide power margin of a reproducing laser beam.

When a sputtering source made of an Ag-Te alloy is sputtered in a mixed gas of a rare gas and a hydrocarbon gas or a hydrocarbon gas, the composition of an Ag-Te alloy contained in a formed recording layer becomes identical to that of the sputtering source, and the content of Ag in the recording layer may be smaller than that of Ag in the sputtering source. For this reason, recording layers having various compositions were formed by the apparatus shown in FIG. 2 using sputtering sources having different compositions, and the compositions of the sputtering sources and the compositions of the recording layers were measured by ICP (induction coupling plasma spectrochemical analysis). FIG. 21 shows the results. FIG. 21 shows a relationship between the content of Ag in each sputtering source plotted along the abscissa axis and the content of Ag in each recording layer plotted along the ordinate axis. As shown in FIG. 21, it was confirmed that the content of Ag in each recording layer tended to be smaller than that of Ag in each sputtering source by about 30%.

EXAMPLE 3

This Example corresponds to the third embodiment of the present invention.

A sputtering source having a composition of $Ag_{33}Te_{67}$ and a diameter of five inches was set in the vacuum vessel of the sputtering apparatus shown in FIG. 2. The vacuum vessel was then evacuated to $1 \times 10^{-6}$ Torr. Thereafter, while Ar gas and $CH_4$ gas respectively were fed in the vessel at 10 SCCM (Q=50%), the pressure in the vessel was adjusted to $5 \times 10^{-3}$ Torr. A sufficiently cleaned polycarbonate disk having an outer diameter of 130 mm and a thickness of 1.2 mm was used as a substrate. While the substrate was rotated at 60 rpm, an electric power to be supplied to the sputtering source was controlled while monitoring a sputtering amount by using the monitor. Sputtering was performed until the thickness of a recording layer reached 250 Å, and formation of the recording layer was completed.

Upon formation of the recording layer, the resultant sample was taken out from the vacuum vessel. Thereafter, an ultraviolet-curing resin was coated on the recording layer to a thickness of about 10 μm by a spin coater, and was cured upon ration of ultraviolet rays. With this process, an optical disk sample (sample S) was obtained.

The sample S was set in a recording/reproducing apparatus and was rotated at 1,800 rpm. At the same time, a recording laser beam having a frequency of 3.7 MHz and a pulse width of 50 nsec was radiated onto the sample S. As a result, a C/N value of 30 dB was obtained at a position of the sample S corresponding to a linear velocity of 5.5 m/sec with a recording power of 7 mW.

Changes in atomic configuration at an irradiated portion of the recording layer of the sample S upon ration of a laser beam were detected. The recording region of the recording layer was irradiated with a pulse light beam having a power of 5 mW and a pulse width of 15 μ sec with its beam diameter being decreased to 1 μm. In this case, the reflectance of the irradiated portion was restored to the original value.

In order to compare the crystal structures of portions respectively corresponding to a recorded state and a non-recorded state, the diffraction patterns of the portions were observed by using a transmission electron microscope. In this case, the sample was set at the electron microscope after a protective layer was peeled off from the sample. As a result, a halo pattern inherent in an amorphous state was observed at a nonirradiated portion, whereas diffraction rings and spots representing a crystal state were observed at an irradiated portion.

Note that if the thickness of a recording layer made of AgTe, C, and H is changed, its reflectance is changed as shown in FIG. 22. It is apparent from FIG. 22 that when the thickness of the recording layer is about 1,000 Å, the reflectance becomes minimum due to a multiple interference effect, so that if phase change from an amorphous state to a crystal state occurs, the reflectance is greatly increased, and a contrast level at the recorded portion is further highered.

An experiment was performed on a relationship between the content of a hydrocarbon gas in a feed gas during sputtering and stability of a recording layer. Recording layers were formed in the same manner as that of the sample S except that the Q values representing the contents of a hydrocarbon gas ($CH_4$) were set to 0% and 5%, thus preparing samples T and U, respectively. These samples T and U and the above-described sample S with Q=50% were left under the conditions of a temperature of 60° C. and a relative humidity of 90%. FIG. 23 shows changes in reflectance of a reproducing laser beam at the respective recording layers, in which the abscissa axis represents an elapsed time and the ordinate axis represents a reflectance which is normalized assuming that an initial reflectance is 1. As shown in FIG. 23, the reflectance of the sample T with Q=0%, i.e., containing no C started decreasing after about 10 hours, whereas the reflectance of the samples S and U containing C started decreasing at later timings than the sample T. It was confirmed that especially the sample with Q=50% exhibited almost no change in reflectance after 1,000 hours.

What is claimed is:

1. An information storage medium comprising:
   a substrate; and
   a recording layer provided on said substrate and including an organic discharge polymer film containing a Te eutectic alloy having a crystallization temperature of not less than 50° C., carbon, and hydrogen.

2. A medium according to claim 1, wherein said Te eutectic alloy contains an element selected from the group consisting of Ge, Sb, Bi, and elements belonging to Group IB of the periodic table.

3. A medium according to claim 1, wherein said recording layer has a thickness of 50 to 1,000 Å.

4. A medium according to claim 3, wherein said recording layer has a thickness of 100 to 300 Å.

5. An information storage medium comprising:
   a substrate; and
   a recording layer provided on said substrate and containing an alloy represented by chemical formula $Ag_xTe_{100-x-y-z}C_yH_z$ (wherein x, y, z are represented in at.% and $2 \leq x \leq 45$, $25 \leq y+z \leq 38$).

6. A medium according to claim 5, wherein the total content of Ag and Te in said recording layer falls within a range of 62 to 75 at.%.

7. A medium according to claim 5, wherein said recording layer has a thickness of 50 to 1,000 Å.

8. A medium according to claim 7, wherein said recording layer has a thickness of 100 to 300 Å.

9. An information storage medium comprising:
   a substrate; and
   a recording layer provided on said substrate, and containing an alloy of Te and an element belonging to Group IB of the periodic table, carbon, and hydrogen,
   said recording layer being a sputtering film formed by setting the content of a hydrocarbon gas in a sputtering gas to within a range of 5 to 50%.

10. A medium according to claim 9, wherein said recording layer has a thickness of 50 to 1,000 Å.

11. A medium according to claim 10, wherein said recording layer has a thickness of 100 to 300 Å.

12. A medium according to claim 9, further comprising an organic protective layer formed on said recording layer.

13. A medium according to claim 9, further comprising a pair of inorganic protective layers sandwiching said recording layer.

14. A medium according to claim 9, wherein said recording layer has a structure in which an alloy of Te and an element belonging to Group IB of the periodic table, carbon, and hydrogen are dispersed in an inorganic material.

15. An information storage medium as claimed in claim 1, wherein tellurium eutectic alloy clusters having a low melting point are dispersed in a matrix of chemically-bonded carbon and hydrogen.

16. An information storage medium as claimed in claim 5, wherein clusters of a tellurium eutectic alloy having a low melting point are dispersed in a matrix of chemically-bonded carbon and hydrogen.

17. An information storage medium as claimed in claim 15, wherein the melting point of the tellurium eutectic alloy is between about 351° and 425° C.

18. An information storage medium as claimed in claim 16, wherein the melting point of the tellurium eutectic alloy is between about 351° and 425° C.

* * * * *